United States Patent [19]

Haacker et al.

[11] Patent Number: 5,072,754
[45] Date of Patent: Dec. 17, 1991

[54] MOUNTING ARRANGEMENT OF A FLOW TARGET PLATE OF A FLUIDIZED-BED REACTOR

[75] Inventors: Heinz Haacker, Kreuztal; J. Ernst Malik; Rainer Schmidt, both of Oberhausen, all of Fed. Rep. of Germany

[73] Assignee: MAN Gutehoffnungshütte Aktiengesellschaft, Oberhausen, Fed. Rep. of Germany

[21] Appl. No.: 618,295

[22] Filed: Nov. 28, 1990

[30] Foreign Application Priority Data

Jan. 12, 1990 [DE] Fed. Rep. of Germany ....... 4000718

[51] Int. Cl.5 ............................................. B01F 3/00
[52] U.S. Cl. ................................... 137/561 A; 261/97
[58] Field of Search ................. 137/561 A, 561 R; 261/97, 98

[56] References Cited

U.S. PATENT DOCUMENTS 3,419,251 12/1968 Eckert ............................ 261/97 X
4,565,216 1/1986 Meier ............................ 137/561 A
4,580,597 4/1986 Cordingley et al. ........... 137/561 A
4,609,010 9/1986 Watson ....................... 137/561 A X
4,759,910 7/1988 Streiff et al. ..................... 261/97 X Primary Examiner—John Rivell
Attorney, Agent, or Firm—McGlew & Tuttle

[57] ABSTRACT

A flow target plate arrangement for the fluidizing medium of a horizontal fluidized-bed reactor, consisting essentially of the fluidized medium supply lines, the collectors, and the flow admission tubes, the flow target plate is mounted exclusively at the passage of the central fluidizing medium supply line (1) in the pipe socket (7) of the pressure tank (6). Two collectors (2), to which flow admission tubes (3) are connected on both sides in the longitudinal direction of the pressure tank (6), extend from the fluidizing medium supply lines (1) according to the present invention, in the circumferential direction of the pressure tank (6). The other ends of the flow admission tubes (3) rest on at least one crossbeam (5). The crossbeams (5) are held by longitudinal beams (4), which are connected to the supply line (1).

2 Claims, 1 Drawing Sheet

MOUNTING ARRANGEMENT OF A FLOW TARGET PLATE OF A FLUIDIZED-BED REACTOR

FIELD OF THE INVENTION

The present invention pertains to a flow target plate for the fluidizing medium in a horizontal fluidized-bed reactor.

The flow target plate has the task of distributing the fluidizing medium over the entire area of a fluidized bed. It usually consists of supply lines, through which the fluidizing medium is fed in, the collector tubes, and the flow admission tubes with the discharge openings or discharge nozzles for the medium.

BACKGROUND OF THE INVENTION

There is known a gas generator arrangement consisting essentially of a horizontally arranged, elongated pressure tank, which surrounds the reaction chamber, which is under excess pressure and high temperature. For protection against the high temperatures occurring inside the tank, the steel jacket of the pressure tank is provided with heat insulation consisting of refractory material. The prior-art gas generator is composed of four identical modules. The pipe socket for the fluidizing medium, here steam or crude gas circulated in a closed cycle, is arranged in the lower zone of each module. The fluidizing medium is distributed via the flow target plate on the inside of the refractory lining and whirls up the coal introduced into the generator to generate a fluidized bed. The actual gasification reaction takes place in the fluidized bed.

The flow target plate located in the bottom zone of the reactor according to the state of the art has flow admission tubes. These flow admission tubes, which are arranged in the circumferential direction of the pressure tank, are held by a support system consisting of collector tubes, which system is mounted in the tank lining, on one hand, and on the stable steel jacket of the pressure tank, on the other hand.

A plurality of wall openings, which in turn form heat bridges, are required for mounting the flow target plate according to the state of the art. In addition, the support structure must absorb additional stresses as a consequence of differences in expansion at the mountings.

A circular flow target plate consisting of fluidizing medium supply lines, collector tubes, and flow admission tubes for distributing the medium in a vertically arranged fluidized-bed reactor is known from EP 03,25,657 Al. The flow target plate is arranged exclusively at the central gas supply line led through the tank bottom of the fluidized-bed reactor.

In East German Patent No. DD 254,638 Al, reference is made to the arrangement of the flow target plate within a fluidized-bed reactor on the central gas supply line.

SUMMARY AND OBJECTS OF THE INVENTION

It is an object of the present invention to provide a flow target plate for a fluidizing medium in a horizontal fluidized-bed reactor, consisting essentially of the fluidizing medium supply lines, the collectors and the flow admission tubes. The flow target plate is mounted at the passage of the central fluidizing medium supply line in the tank socket of the pressure tank, which is of simple design. It is also suitable for large-surface embodiments, and permits thermal expansions of the flow admission tubes without damage.

According to the invention, a flow target plate for a fluidizing medium in a horizontal fluidized-bed reactor is provided including the fluidizing medium supply line, collectors and flow admission tubes, the flow target plate being mounted at the passage of the central fluidizing medium supply line in the tank socket of the pressure tank. Two collectors are provided including openings for connecting flow admission tubes on each side, extending in a longitudinal direction of the pressure tank. The two collectors extend in the circumferential direction of the pressure tank. Opposite ends of the flow admission tubes are supported on at least one cross beam. Each cross beam is supported by longitudinal beams which are connected to the supply line.

The flow target plate is mounted in the tank socket of the pressure tank at one point only, namely, at the passage of the centrally arranged fluidizing medium supply line.

Two collector tubes, to which the flow admission tubes located in the longitudinal direction of the tank are connected, are branched off from the supply line in the circumferential direction of the pressure tank. In the area of the free ends of the flow admission tubes, these are held in crossbeams, which in turn are supported by longitudinal beams. These longitudinal beams are rigidly connected to the fluidizing medium supply line.

The flow admission tubes are not usually fastened in the crossbeams, but are guided and freely movably. If the temperature in the flow admission tubes and outside the tubes were guaranteed to remain approximately the same, it would also be possible to fasten the tubes on the crossbeams.

Depending on the length of the free flow admission tubes, it is possible to arrange additional crossbeams.

The materials of the structural components used for the flow target plate, such as the supply line, the collector tubes, the flow admission tubes, and the beams, should have identical or nearly identical coefficients of thermal expansion.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawing:

The single FIGURE is a perspective view showing details of the flow target plate according to the present invention.

DETAILED DESCRIPTION OF THE PREFERRED EMBODIMENT

Figure 1:
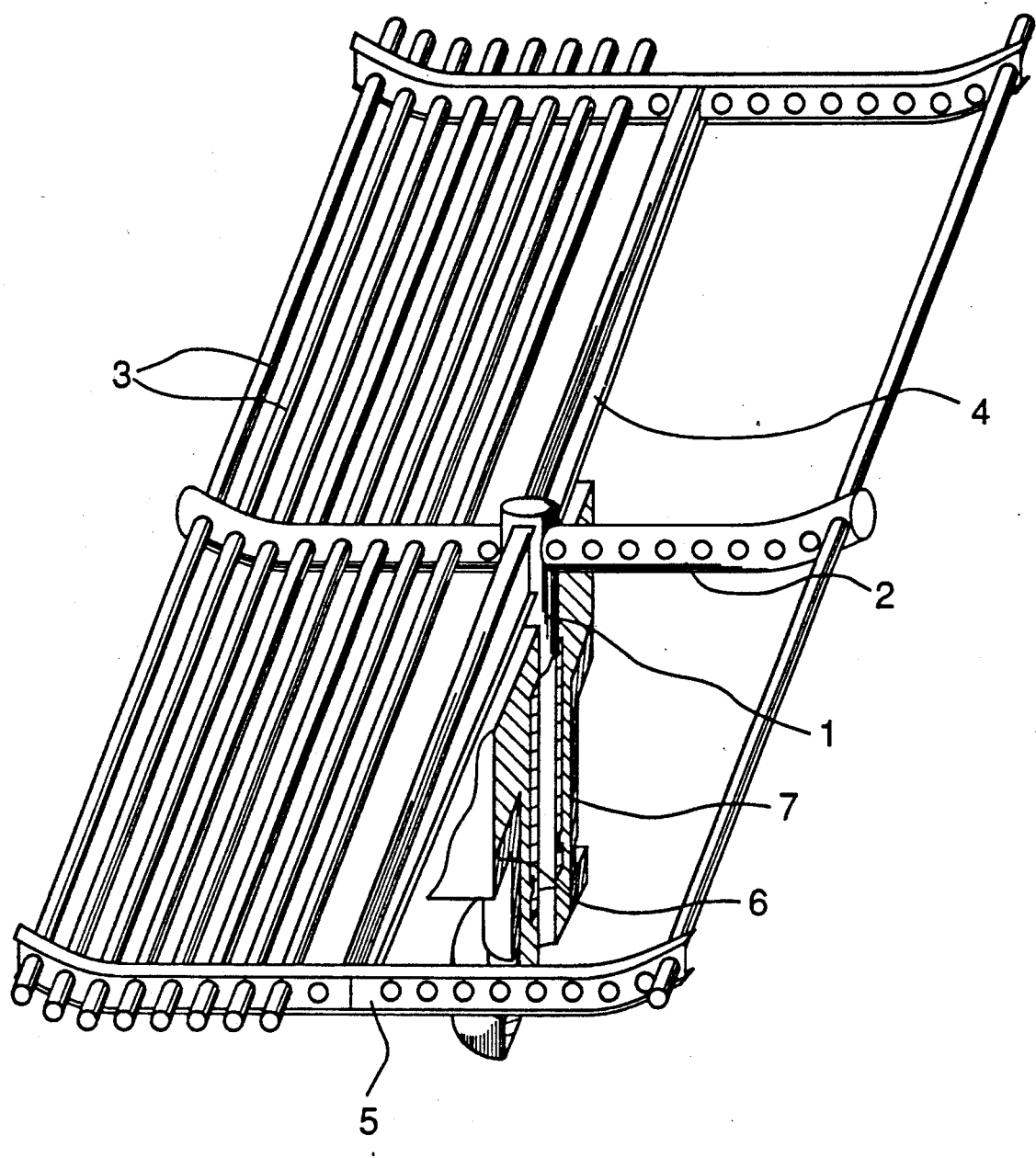

Referring to the drawing in particular, a flow target plate is mounted at the passage of a central supply line 1 for the fluidizing medium in the pipe socket 7 of a pressure tank 6. Of the pressure tank 6, only the area of the connection of the tank pipe socket 7, which is welded to the steel jacket of the pressure tank is shown. The refractory lining inside the tank pipe socket and the pressure tank steel jacket are indicated.

Two collector tubes 2 are branched off from the supply line 1 in the circumferential direction of the pressure tank 6. The collector tubes are joined by a plurality of flow admission tubes 3 arranged in the longitudinal direction of the horizontal pressure tank. The flow admission tubes 3 rest in crossbeams 5 provided with circular recesses. The crossbeams 5 are held by longitudinal beams 4, which are rigidly arranged on the central supply line 1.

The flow admission tubes have discharge openings (not shown) for the fluidizing medium, which are preferably arranged on the lower sides of the tubes in order to prevent fluidized material from penetrating when not in operation.

While a specific embodiment of the invention has been shown and described in detail to illustrate the application of the principles of the invention, it will be understood that the invention may be embodied otherwise without departing from such principles.

What is claimed is:

1. A flow target plate for a fluidizing medium in a horizontal fluidized-bed reactor including fluidizing medium supply lines, collectors and flow admission tubes, the target plate being mounted a passage of the fluidizing medium supply line in a tank socket of the reactor, comprising:

a first collector and a second collector; flow admission tubes connected on each side, with respect to a longitudinal direction of the reactor, of each of said collectors, said collectors extending in a circumferential direction of said reactor; at least one cross beam connected to ends of said flow admission tubes; and, longitudinal beams connected to the supply line, said longitudinal beams supporting said cross beams.

2. A horizontal fluidized-bed reactor arrangement, comprising:

a horizontal pressure having a central supply line for conveying a fluidizing medium; two collector tubes branched off from said supply line and extending in a circumferential direction of said pressure tank; a plurality of flow admission tubes joined to said collector tubes on each side of said supply line, said flow admission tubes being arranged in a longitudinal direction of the horizontal pressure tank; cross beams provided with circular recesses, said cross beams supporting said flow admission tubes at adjacent ends of said flow admission tubes; and longitudinal beams rigidly connected to said central supply line, said longitudinal beams supporting said cross beams.

* * * * *